United States Patent
DeHoff et al.

(10) Patent No.: US 11,465,673 B2
(45) Date of Patent: Oct. 11, 2022

(54) MOTOR-ASSISTED STEERING BALL-SCREW

(71) Applicant: Schaeffler Technologies AG & Co. KG, Herzogenaurach (DE)

(72) Inventors: Kyle DeHoff, Canal Fulton, OH (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 214 days.

(21) Appl. No.: 16/853,929

(22) Filed: Apr. 21, 2020

(65) Prior Publication Data

US 2020/0339183 A1 Oct. 29, 2020

Related U.S. Application Data

(60) Provisional application No. 62/838,663, filed on Apr. 25, 2019.

(51) Int. Cl.
*B62D 5/04* (2006.01)
*B62D 5/00* (2006.01)
*B62D 3/02* (2006.01)
*B62D 3/08* (2006.01)
*B62D 1/20* (2006.01)

(52) U.S. Cl.
CPC ........... *B62D 5/0448* (2013.01); *B62D 5/008* (2013.01); *B62D 1/20* (2013.01); *B62D 3/02* (2013.01); *B62D 3/08* (2013.01)

(58) Field of Classification Search
CPC ........ B62D 5/0448; B62D 5/008; B62D 1/20; B62D 3/02; B62D 3/08; B62D 5/0421
See application file for complete search history.

(56) References Cited

U.S. PATENT DOCUMENTS

| | | | | |
|---|---|---|---|---|
| 4,658,927 A * | 4/1987 | Kanazawa | ............... | B62D 6/02 180/422 |
| 5,423,391 A * | 6/1995 | Shimizu | ................. | B62D 5/008 180/446 |
| 6,543,569 B1 * | 4/2003 | Shimizu | ................. | B21K 1/767 180/444 |
| 6,655,494 B2 * | 12/2003 | Menjak | .................. | B62D 5/008 180/444 |
| 2011/0247891 A1 * | 10/2011 | Meyer | ...................... | H02K 5/24 180/443 |
| 2012/0241244 A1 * | 9/2012 | Escobedo | ............ | B62D 5/0421 180/444 |
| 2013/0032430 A1 * | 2/2013 | Zaloga | ................. | B62D 5/0421 180/444 |
| 2015/0329138 A1 * | 11/2015 | Peterreins | ........... | F16H 25/2204 74/424.75 |
| 2016/0200351 A1 * | 7/2016 | Malone | .................. | B62D 5/008 701/41 |
| 2018/0022381 A1 * | 1/2018 | Matsumura | ............ | B62D 5/065 180/419 |
| 2018/0111641 A1 * | 4/2018 | Hetzel | ................. | F16H 25/2204 |

(Continued)

*Primary Examiner* — Tony H Winner
*Assistant Examiner* — Marlon A Arce

(57) ABSTRACT

A power assisted steering system provides a gear reduction between a steering wheel and a steering mechanism and a much larger gear reduction between an electric motor and a steering mechanism. The system is back-driveable from the steering mechanism. The system utilizes a ball-screw, several helical gears, and two bevel gears. A rack fixed to the ball-screw nut drives a sector gear.

20 Claims, 3 Drawing Sheets

(56) References Cited

U.S. PATENT DOCUMENTS

| | | | |
|---|---|---|---|
| 2018/0334185 A1* | 11/2018 | StHilaire | B62D 5/065 |
| 2019/0329815 A1* | 10/2019 | Illes | B62D 5/0424 |
| 2020/0298903 A1 | 9/2020 | Hrusch et al. | |
| 2021/0387667 A1* | 12/2021 | Ishihara | B62D 5/0406 |

* cited by examiner

MOTOR-ASSISTED STEERING BALL-SCREW

CROSS-REFERENCE TO RELATED APPLICATIONS

This application claims priority to U.S. Provisional Application 62/838,663 filed Apr. 25, 2019, the entire disclosure of which is incorporated by reference herein.

TECHNICAL FIELD

The present disclosure relates to the field of electric power steering mechanisms for motor vehicles.

BACKGROUND

In large vehicles, the driver effort required to steer may be large. One way of reducing the steering effort is to provide a high gear ratio such that the driver turns the steering wheel through a large angle in order to change the steering angle a given amount. There are practical limits to this approach. Sometimes it is necessary to change the steering angle by a large amount. An excessive gear ratio would imply an excessive number of turns of the steering wheel to accomplish the necessary steering angle change. Also, an excessive gear ratio may adversely impact the driving feel, especially at high vehicle speeds. Therefore, various power-assisted steering systems have been developed. One type of power-assisted steering system utilizes an electric motor linked to the steering mechanism. When a controller detects a torque being applied by the driver, it commands the electric motor to exert a torque which is added to the torque applied by the driver. The ratio of electric motor torque to driver applied torque may vary based on vehicle speed or other parameters.

Some mechanisms which provide a high gear reduction ratio, such as worm gears, do not transmit torque in the opposite direction. Instead, they act as locks when driven from the speed-reduced end. Such mechanisms are problematic in a steering system because the system should return to neutral in response to forces on the vehicle tires when input torque on the steering system is removed.

In autonomous vehicles, the controller directly steers the vehicle without a driver turning the steering wheel. In some cases, the steering wheel may be physically removed.

SUMMARY

A power-assisted steering system includes a ball-screw, a rack, and a sector gear. The ball-screw has a spindle supported for rotation about an axis and a ball-nut supported for axial movement along the axis and constrained against rotation about the axis. The rack is fixed to the ball-nut. The sector gear meshes with the rack and is configured to change the axis of rotation of vehicle wheels. The spindle is driveably connected to a rotor of an electric motor with an underdrive gear ratio such that the spindle rotates slower than the rotor. For example, the spindle may be driveably connected to the rotor by a first geartrain including first and second helical gears. The first helical gear may be fixed to the spindle. The second helical gear may be fixed to the rotor and may mesh with the first helical gear. The spindle is driveably connected to a steering wheel with an overdrive gear ratio such that the spindle rotates faster than the steering wheel. The steering wheel may be supported for rotation about an axis perpendicular to an axis of rotation of the spindle. For example, the spindle may be driveably connected to the steering wheel by a second geartrain third and fourth helical gears and first and second bevel gears. The third helical gear may be fixed to the spindle. The fourth helical gear may mesh with the third helical gear. The first bevel gear may be fixed to the fourth helical gear. The second bevel gear may mesh with the first bevel gear and be fixed to the steering wheel. The rack may be fixed to a first side of a block which is bolted to the nut. Two slide bearings may be fixed to a second side and a third side of the block respectively to decrease friction as the block slides against a housing. The third side of the block may be opposite the first side of the block.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
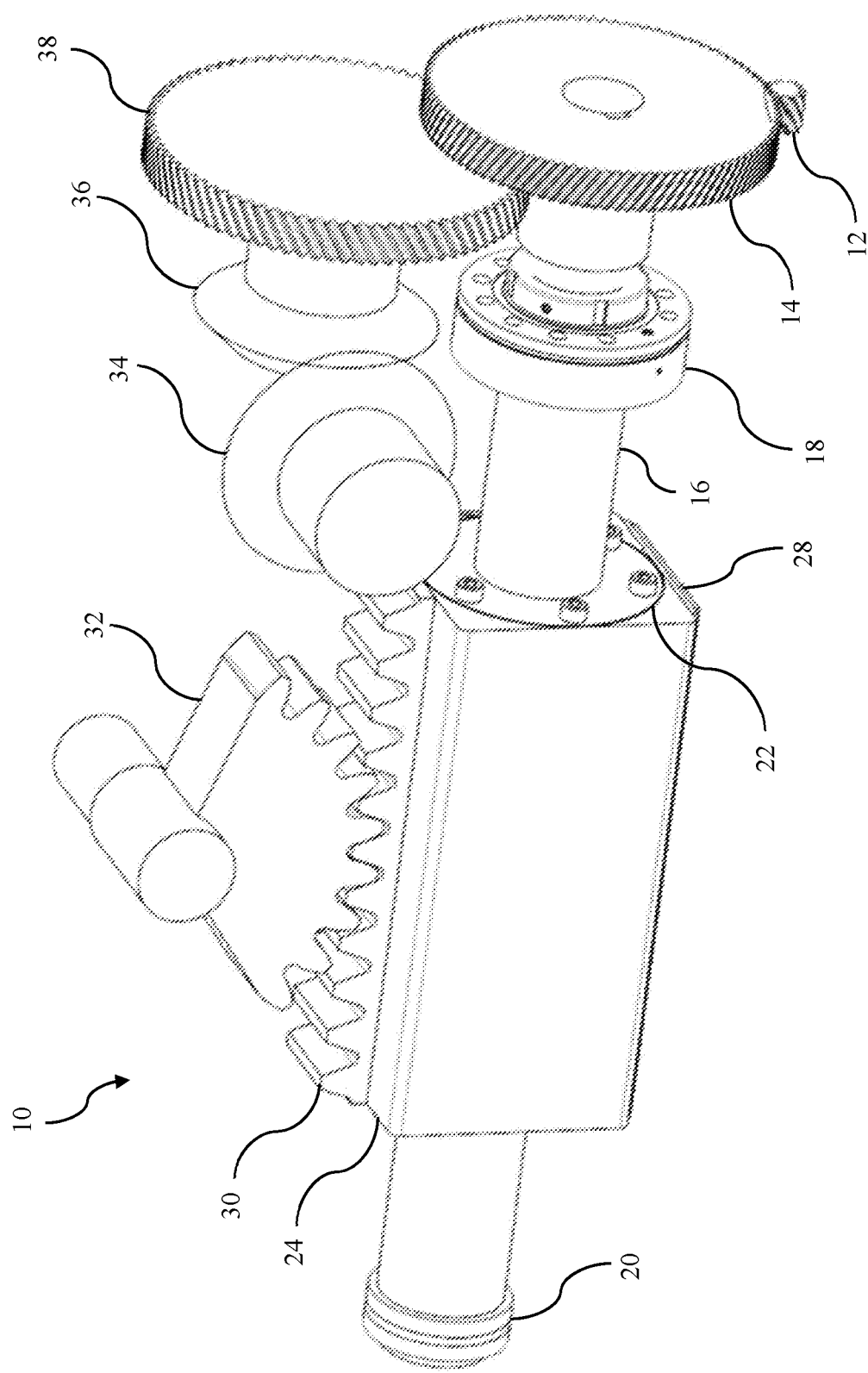
FIGS. 1 and 2 are pictorial illustrations, from different viewing angles of a motor-assisted steering mechanism.
Figure 2:
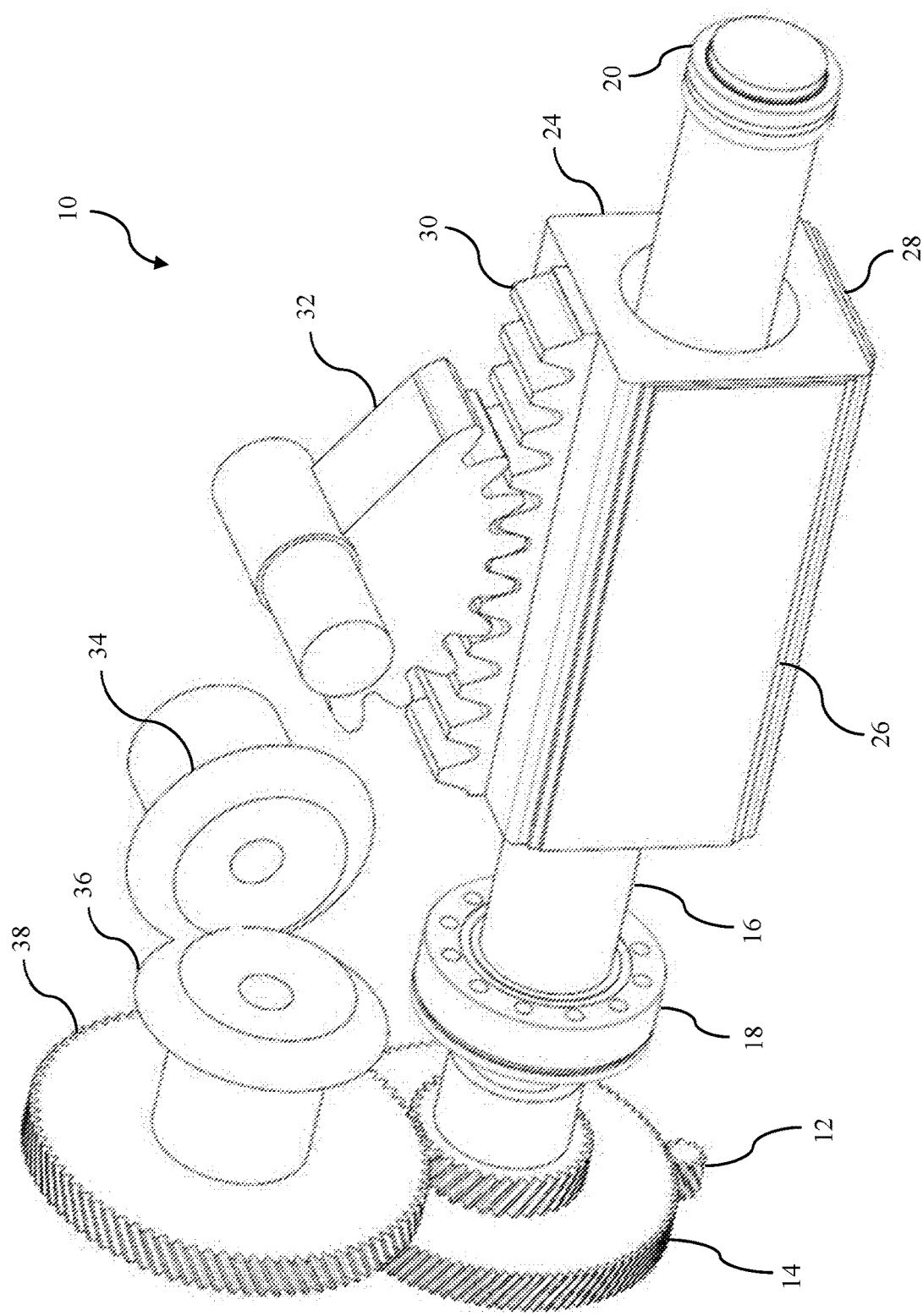
Figure 3:
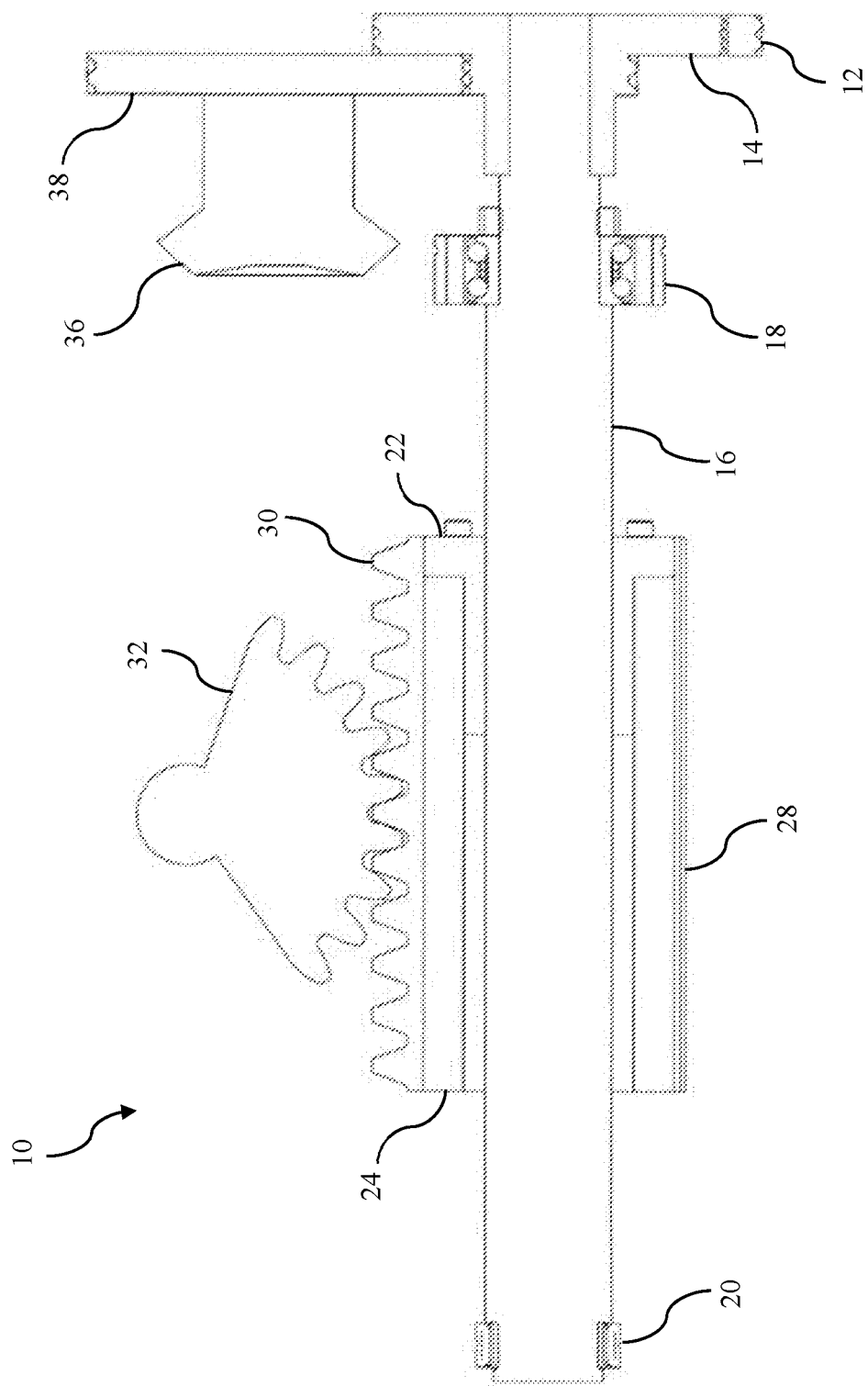
FIG. 3 is a sectional view of the motor-assisted steering mechanism of FIGS. 1 and 2.

A proposed steering system includes a ball screw with dual inputs (FIGS. 1 through 3). The first input, an electric motor, drives a compound gear connected to one end of the ball screw. The second input is a steering wheel whose shaft is perpendicular to the ball screw. The steering wheel shaft is rigidly connected to a bevel gear that meshes to the bevel gear end of a second compound gear. Then, the second compound gear meshes with the compound gear of the first input, allowing torque from two different sources. As torque enters the system, a flanged ball nut, integral with a rack and held from rotating, receives torque from the ball screw shaft and produces linear motion along the axis. The linear motion generates an output torque as the rack teeth are meshed with a sector gear whose shaft is used to drive a Pitman arm.

FIG. 1 shows a three-dimensional view of the ball screw steering mechanism. A gear 12, driven by an electric motor, serves as an input to the steering system and meshes with a compound gear 14 comprised of two helical gears. Torque is transferred into a spindle 16 of a ball screw from the helical compound gear 14 through a key. Two bearings 18 and 20 serve as supports for the spindle. Bearing 18 is press fit and bolted to a housing (not depicted) and reacts radial and axial load experienced by the spindle. Similarly, bearing 20 is also pressed into the housing and reacts the remaining radial load. A flanged ball nut 22, threaded onto the spindle 16, serves to convert rotational motion and torque to linear motion and force. A set of balls separate external threads of spindle 16 from internal threads of nut 22, thus reducing friction. The nut 22 is bolted to a block 24 which is in contact with the housing on at least two sides. This block 24 prevents the ball nut 22 from rotating with respect to the housing while allowing axial motion of the ball nut 22 to occur. Two slides bearings 26 and 28 are attached to the faces of the block 24 that contact the housing. The bearings 26 and 28 decrease friction losses developed as the block 24 slides against the housing with linear motion. These bearings also react the system gear separation forces and the weight loading from the block. To create an output torque, a rack 30 is rigidly attached to a third face of the block 24. Rack 30 meshes with a sector gear 32. The linear motion of the rack 30 rotates the shaft of the sector gear 32 which outputs to a Pitman arm, turning the wheels of the truck.

In addition to the electric motor, the steering system features a steering wheel as a secondary input. The steering wheel shaft enters the system perpendicular to the axis of the ball screw 16 and rigidly connects to a first bevel gear 34. A second bevel gear 36, parallel to the ball screw 16, meshes with first bevel gear 36. Bevel gear 36 is rigidly connected to a helical gear 38. Helical gear 38 then meshes with the second helical gear portion of compound gear to transfer torque from the steering wheel to the ball screw 16. The total ratio between the steering wheel input and the ball screw shaft can be tuned to the correct driver effort level by adjusting the total ratio from the bevel gear pair (34 and 36) and compound gear pairs (38 and 14). The torque of the ball screw then follows the same load path as described above and eventually outputs to the Pitman arm, turning the wheels of the truck.

In an electric motor-assisted steering system, a high gear ratio between the rotor and the Pitman arm permits use of a smaller electric motor. This high gear ratio is accomplished by a high gear ratio between input gear 12 and the larger helical gear of compound gear 14 and also by a high ratio provided by the ball screw mechanism. The gear ratio between the steering wheel and the Pitman arm is dramatically less than the gear ratio between the rotor and the Pitman arm due to an over-drive ratio between the steering wheel and the spindle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A power-assisted steering system comprising:
    a ball-screw having a spindle supported for rotation about an axis and a ball-nut supported for axial movement along the axis and constrained against rotation about the axis;
    a rack fixed to the ball-nut; and
    a sector gear meshing with the rack and configured to change an axis of rotation of vehicle wheels; wherein
    the spindle is driveably connected to a rotor of an electric motor with a constant underdrive gear ratio such that the spindle always rotates slower than the rotor; and
    the spindle is driveably connected to a steering wheel with a constant overdrive gear ratio such that the spindle always rotates faster than the steering wheel.

2. The power-assisted steering system of claim 1 wherein the spindle is driveably connected to the rotor by a first geartrain comprising:
    a first helical gear fixed to the spindle; and
    a second helical gear fixed to the rotor and meshing with the first helical gear.

3. The power-assisted steering system of claim 1 wherein the steering wheel is supported for rotation about an axis perpendicular to an axis of rotation of the spindle.

4. The power-assisted steering system of claim 3 wherein the spindle is driveably connected to the steering wheel by a second geartrain comprising:
    a third helical gear fixed to the spindle;
    a fourth helical gear meshing with the third helical gear;
    a first bevel gear fixed to the fourth helical gear; and
    a second bevel gear meshing with the first bevel gear and fixed to the steering wheel.

5. The power-assisted steering system of claim 2 wherein the spindle is driveably connected to the steering wheel by a second geartrain comprising:
    a third helical gear fixed to the spindle, the third helical gear having a pitch diameter less than a pitch diameter of the first helical gear;
    a fourth helical gear meshing with the third helical gear, the fourth helical gear having a pitch diameter greater than a pitch diameter of the second gear;
    a first bevel gear fixed to the fourth helical gear; and
    a second bevel gear meshing with the first bevel gear and fixed to the steering wheel.

6. The power-assisted steering system of claim 1 wherein:
    the rack is fixed to a first side of a block which is bolted to the ball-nut; and
    two slide bearings are fixed to a second side and a third side of the block respectively to decrease friction as the block slides against a housing.

7. The power-assisted steering system of claim 6 wherein the third side of the block is opposite the first side of the block.

8. A power-assisted steering system comprising:
a ball-screw having a spindle supported for rotation about an axis and a ball-nut supported for axial movement along the axis and constrained against rotation about the axis;
a compound gear rotationally fixed to the spindle, the compound gear comprising:
a first gear portion having a first diameter; and
a second gear portion, rotationally fixed to the first gear portion to rotate at a same rotational speed as the first gear portion, the second gear portion having a second diameter, different than the first diameter;
a rack fixed to the ball-nut; and
a sector gear meshing with the rack and configured to change an axis of rotation of vehicle wheels; wherein
the spindle is drivably connected to a rotor of an electric motor through the first gear portion;
the spindle is drivably connected to a steering wheel through the second gear portion; and the steering wheel is supported for rotation about an axis perpendicular to an axis of rotation of the spindle.

9. The power-assisted steering system of claim 8 wherein the spindle is drivably connected to the rotor with an underdrive gear ratio such that the spindle rotates slower than the rotor.

10. The power-assisted steering system of claim 9 wherein the spindle is driveably connected to the rotor by a first geartrain comprising:
the compound gear; and
a second helical gear fixed to the rotor and meshing with the first gear portion.

11. The power-assisted steering system of claim 8 wherein the spindle is drivably connected to the steering wheel with an overdrive gear ratio such that the spindle rotates faster than the steering wheel.

12. The power-assisted steering system of claim 11 wherein the spindle is driveably connected to the steering wheel by a second geartrain comprising:
the compound gear;
a fourth helical gear meshing with the second gear portion;
a first bevel gear fixed to the fourth helical gear; and
a second bevel gear meshing with the first bevel gear and fixed to the steering wheel.

13. The power-assisted steering system of claim 8 wherein:
the rack is fixed to a first side of a block which is bolted to the ball-nut; and
two slide bearings are fixed to a second side and a third side of the block respectively to decrease friction as the block slides against a housing.

14. The power-assisted steering system of claim 13 wherein the third side of the block is opposite the first side of the block.

15. A power-assisted steering system comprising:
a ball-screw having a spindle supported for rotation about an axis and a ball-nut supported for axial movement along the axis and constrained against rotation about the axis;
a rack fixed to the ball-nut; and
a sector gear meshing with the rack and configured to change an axis of rotation of vehicle wheels; wherein
the spindle is drivably connected to a rotor of an electric motor;
the spindle is drivably connected to a steering wheel;
the rack is fixed to a first side of a block which is bolted to the ball-nut; and
two slide bearings are fixed to a second side and a third side of the block respectively to decrease friction as the block slides against a housing.

16. The power-assisted steering system of claim 15 wherein the spindle is drivably connected to the rotor with an underdrive gear ratio such that the spindle rotates slower than the rotor.

17. The power-assisted steering system of claim 16 wherein the spindle is driveably connected to the rotor by a first geartrain comprising:
a first helical gear fixed to the spindle; and
a second helical gear fixed to the rotor and meshing with the first helical gear.

18. The power-assisted steering system of claim 15 wherein the spindle is drivably connected to the steering wheel with an overdrive gear ratio such that the spindle rotates faster than the steering wheel.

19. The power-assisted steering system of claim 18 wherein the spindle is driveably connected to the steering wheel by a second geartrain comprising:
a third helical gear fixed to the spindle;
a fourth helical gear meshing with the third helical gear;
a first bevel gear fixed to the fourth helical gear; and
a second bevel gear meshing with the first bevel gear and fixed to the steering wheel.

20. The power-assisted steering system of claim 13 wherein the third side of the block is opposite the first side of the block.

* * * * *